US007530434B2

(12) United States Patent
Bitter

(10) Patent No.: US 7,530,434 B2
(45) Date of Patent: May 12, 2009

(54) HYDRAULIC SYSTEM

(75) Inventor: Marcus Bitter, Contwig (DE)

(73) Assignee: Deere & Company, Moline, IL (US)

( * ) Notice: Subject to any disclaimer, the term of this patent is extended or adjusted under 35 U.S.C. 154(b) by 615 days.

(21) Appl. No.: 11/286,737

(22) Filed: Nov. 23, 2005

(65) Prior Publication Data

US 2006/0108185 A1 May 25, 2006

(30) Foreign Application Priority Data

Nov. 23, 2004 (DE) ...................... 10 2004 056 418

(51) Int. Cl.
*F16D 31/02* (2006.01)

(52) U.S. Cl. ........................ 188/151 R; 60/413; 60/469

(58) Field of Classification Search ............. 188/151 R; 280/6.153, 124.16; 60/413, 469
See application file for complete search history.

(56) References Cited

U.S. PATENT DOCUMENTS 4,995,517 A * 2/1991 Saotome ..................... 212/299
5,587,907 A * 12/1996 Shibata et al. ................ 701/37
5,642,282 A * 6/1997 Sonehara ..................... 701/37
6,196,555 B1 * 3/2001 Gaibler .................... 280/6.154
6,988,363 B2 * 1/2006 Bitter .......................... 60/468
7,337,610 B2 * 3/2008 Bitter .......................... 60/469
2002/0070510 A1 * 6/2002 Rogala .................... 280/6.153
2007/0033933 A1 * 2/2007 Bitter .......................... 60/413

FOREIGN PATENT DOCUMENTS

DE 197 34 658 8/1997
DE 101 04 298 1/2001
DE 102 27 966 6/2002
EP 1 157 963 5/2001
JP 58-121305 7/1983

* cited by examiner

*Primary Examiner*—Christopher P Schwartz

(57) ABSTRACT

A hydraulic system for a suspension system is disclosed. The system has a hydraulic cylinder, a hydraulic tank, a conveying means, a hydraulic accumulator, a control device, a load holding device disposed between the hydraulic accumulator and the hydraulic cylinder, and an on-off valve disposed between the hydraulic accumulator and the control device. In order to provide a suspension function for the hydraulic cylinder while simultaneously ensuring safeguarding of the hydraulic cylinder and of the hydraulic accumulator against a pressure drop in the case of a tube break, the present invention provides a system that controls the on-off valve and the load holding device synchronously through a control pressure device, such that when the suspension function is activated the load holding device is opened and the on-off valve is closed.

18 Claims, 7 Drawing Sheets

HYDRAULIC SYSTEM

TECHNICAL FIELD

The present invention relates to a hydraulic system for a suspension system and to suspension systems for booms or rocker arms for construction equipment.

BACKGROUND

In machines used in agriculture, such as for example telescope loaders, wheel loaders, or front-end loaders on tractors, it is known to use a hydraulic suspension system that cushions the boom or the rocker arm in order to achieve an overall improvement of the vehicle suspension and riding comfort, especially when the vehicle is traveling. These types of hydraulic suspension systems use a suitable hydraulic system of valves, a hydraulic cylinder and a hydraulic accumulator. The lifting side of the hydraulic cylinder is connected to the hydraulic accumulator to achieve the required suspension by. In addition, the lowering side of the hydraulic cylinder is connected to a hydraulic tank to avoid cavitation and to enable free movement of the piston rod during the suspension process.

In order to increase safety against a sudden lowering of the boom or rocker arm, these suspension systems have a load holding device to prevent hose breaks. However, in order to lower the hydraulic cylinder it is necessary to close the tank connection of the lowering side of the hydraulic cylinder so that a required pressure can build up in order to open the load holding device. Oil will flow off from the lifting side of the hydraulic cylinder only when the load holding device has been opened.

A hydraulic system for a suspension system of this type is disclosed in EP 1 157 963 A2. The suspension system for the boom of a telescope loader is proposed. The suspension system provides a load holding device for safeguarding against a pressure drop in a hydraulic cylinder and in a hydraulic accumulator. The load holding device essentially comprises a check valve that, in combination with a controllable pressure relief valve, can be bypassed by bringing the pressure relief valve from a normally closed position into an opened position using control pressure lines. In order to avoid limiting the functionality of the suspension system, or to avoid hindering an exchange of hydraulic fluid between the hydraulic accumulator and the hydraulic cylinder, the load holding device is situated at the supply side before the hydraulic cylinder and the hydraulic accumulator. A disadvantage of this system is that it provides only one load holding device for safeguarding pressure-loaded hydraulic components. A hose break occurring between the hydraulic cylinder and the hydraulic accumulator would result in the boom falling downward, and is thus not safeguarded by the load holding device.

Therefore, a need exists to create a hydraulic system of the type described above that provides a separate safeguard for the hydraulic cylinder and the hydraulic accumulator, while at the same time providing a suspension function.

SUMMARY

In an aspect of the present invention, a hydraulic system having a first on-off valve disposed in a first line between the load holding device and the control device is provided. Further, a hydraulic accumulator between the load holding device and the first on-off valve is connected to the first hydraulic line, and the load holding device. The first on-off valve can be controlled synchronously independent of a filling pressure of the hydraulic cylinder.

The load holding device is capable of being switched from a closed position oriented in the direction of the control device into an open position, and the first on-off valve is switched from an open position into a closed position oriented in the direction of the control device. Because the first on-off valve is disposed between the hydraulic accumulator and the control device and the load holding device is disposed between the hydraulic accumulator and the hydraulic cylinder, a separate safeguard of the hydraulic cylinder and of the hydraulic accumulator is ensured.

The first on-off valve is fashioned in such a way that in the closing position it closes in the direction of the control device without leakage. In addition, due to the fact that the on-off valve and the load holding device can be switched synchronously in such a way that an opening of the load holding device is connected with a closing of the first on-off valve, it is ensured that a suspension function can take place through the hydraulic accumulator for the hydraulic cylinder.

The hydraulic system is provided with a hydraulic control pressure device that is set via a conveying means that produces a control pressure. A control pressure line for valves that are to be switched hydraulically is connected optionally to the conveying means or to the hydraulic tank, via a control pressure valve. The present invention contemplates providing an arrangement of a plurality of control pressure lines that can be operated independent of one another via additional control pressure valves, so that a plurality of hydraulically switchable on-off valves can be switched independent of one another. For example, the load holding device and the first on-off valve can then be controlled by mutually independent control pressure lines.

In order to enable hydraulic control of the load holding device from pressure prevailing in the hydraulic cylinder and by pressure provided by the control pressure device, a pressure-controlled means is provided in the form of a shuttle valve. The shuttle valve is connected at one inlet side to a first control pressure line of the control pressure device and is connected at another inlet side to a second control pressure line that is connected to a chamber of the hydraulic cylinder. Depending on the pressure occurring in the control pressure lines, the shuttle valve is fed either at the hydraulic cylinder side or at the control pressure device side. Preferably, the shuttle valve is connected to a second chamber of the hydraulic cylinder.

The first on-off valve is preferably connected to the control pressure device by a third control pressure line that branches from the first control pressure line. This ensures that the first on-off valve and the pressure-controlled means can be controlled essentially synchronously, or in parallel. The pressure-controlled means, fashioned as a shuttle valve, is connected at the outlet side to the load holding device via a fourth control pressure line, so that the load holding device can be controlled, or opened, for example, via the pressure acting in the second chamber of the hydraulic cylinder or via the pressure produced by the control pressure device.

A fifth control pressure line connected to the first chamber of the hydraulic cylinder enables the load holding device to be opened by the pressure acting in the first chamber. In this way, it is ensured that the load holding device opens when, for example, a pressure is reached that overloads the hydraulic cylinder (e.g., due to excessive loads), so that hydraulic fluid can flow out of the first chamber in a controlled manner.

Between the hydraulic accumulator and the first line there is provided a second on-off valve that can be brought into an open position or into a position that closes in one direction or in both directions. The second on-off valve connects the hydraulic accumulator to the hydraulic cylinder, so that the hydraulic cylinder can have a cushioning effect when the load holding device is opened. Preferably, the second on-off valve is fashioned in such a way that it closes without leakage, such that when it is in a position in which it closes in one direction, it closes only in the direction of the hydraulic accumulator. A design of the second on-off valve so as to close in one direction ensures that pressure compensation can take place at the hydraulic accumulator.

An additional safeguarding of the hydraulic accumulator is provided by connecting a line having a pressure relief valve to the hydraulic accumulator, which line is disposed between the second on-off valve and the hydraulic accumulator. Further, the line connects the hydraulic accumulator with the hydraulic tank. In this way, for example pressure peaks that occur in the hydraulic accumulator, which could arise when there are excessively strong cushioning movements of the hydraulic cylinder, are dissipated. The hydraulic accumulator is safeguarded against excess pressure by the pressure relief valve. Similar systems may be used in order for example to protect the conveying means against excess pressure.

In order to supply a second chamber of the hydraulic cylinder, the hydraulic system is provided with a second line that connects the control device to the second chamber. The second line allows the hydraulic cylinder to be charged with pressure at both sides, so that pressure-charged raising and lowering of the hydraulic cylinder, controlled by the control device, is provided.

A third line, which is provided with a third on-off valve and is connected to the second chamber and to the hydraulic tank, makes it possible for hydraulic fluid to flow off from the second chamber of the hydraulic cylinder independent of the setting of the control device. By opening the third on-off valve, for example, in a neutral setting of the control device (in which the first and second line are closed) a cushioning movement of the hydraulic cylinder in both directions can take place without a vacuum occurring in the second chamber (decreasing cushioning movement) and a suspension-inhibiting excess pressure occurring in the second chamber (increasing cushioning movement). For the pressure-charged lowering of the hydraulic cylinder, the third on-off valve can be closed.

The first chamber of the hydraulic cylinder can advantageously be brought into connection with the hydraulic accumulator via a fourth line. The fourth line is preferably provided with a check valve that closes in the direction of the hydraulic accumulator without leakage. In this way, pressure compensation can take place at the hydraulic accumulator, resulting in advantages in the suspension function (in that a bucking or jerking lifting of the hydraulic cylinder is avoided when the suspension function is switched active). In this exemplary embodiment, at the same time the second on-off valve should be fashioned in such a way that in the closed position it closes without leakage in both directions. In addition, it is possible to provide the fourth line with a throttle or choke instead of the check valve, so that constant but moderate pressure compensation can take place between the hydraulic cylinder and the hydraulic accumulator in both directions.

It is also conceivable to situate the throttle in a parallel circuit to the check valve. This would have the advantage that an unthrottled pressure compensation can always take place at the hydraulic accumulator in the direction of the hydraulic cylinder, so that even in the case of rapid load changes the same pressure can always arise in the hydraulic cylinder, and a brief slackening or slumping of the hydraulic cylinder is also avoided.

In order to check whether the hydraulic cylinder is situated in a position that is preferred for the activation of the suspension, for example, in a fully lowered position, a sensor can be provided. The sensor can be fashioned as a contact switch or as an angle sensor that is coupled to the movement of the hydraulic cylinder and thus to its position. Depending on the output of the sensor, the suspension function can then be activated or blocked.

In order to check whether the hydraulic cylinder is in a pressure state that is preferred for the activation of the suspension, for example, in a state charged with low pressure or in a pressureless state, a pressure sensor or pressure switch can be provided. Depending on the output of the sensor or switch, the suspension function can then be activated or blocked.

Via the control pressure device, one or more on-off valves can be controlled. In an exemplary embodiment, the load holding device and the first on-off valve are controlled via the first control pressure line and via the shuttle valve, so that a synchronous switching is ensured. In additional exemplary embodiments, additional on-off valves, such as e.g. the second and the third on-off valve, can be controlled via the first control pressure line, so that by switching the first control pressure valve the load holding device and the first to third on-off valves can be switched synchronously. However, it is conceivable to carry out a controlling separate from the first control pressure line and to provide a second control pressure valve in the control pressure device, so that a controlling of additional on-off valves independent of the first control pressure valve can be carried out. For example, the load holding device and the first on-off valve can be controlled via the first control pressure line or via the first control pressure valve, and the second and third on-off valves can be controlled via a second control pressure line or via a second control pressure valve. In addition, other control combinations and variants are also conceivable.

In another exemplary embodiment, one or more on-off valves can be controlled electrically. For example, the load holding device and the first on-off valve are controlled via the control pressure device, the first control pressure valve and the second and third on-off valve being switched electrically. The suspension is then activated through electrical switching of the first control pressure valve and of the second and third on-off valves. The present invention also contemplates controlling only the load holding device via the control pressure device and to switch the first to third on-off valves electrically. For the monitoring and synchronization of electrical switching processes and switching states, an electronic control device or an electrical controller can be used.

Between the hydraulic accumulator and the first chamber, there can also be situated what is known as a pressure compensation device, which compensates the pressure in the hydraulic accumulator during a working cycle with the pressure of the first chamber. The pressure compensation device provides a pressure compensation of the hydraulic accumulator with the first chamber of the hydraulic cylinder by providing a line that has a check valve that opens in the direction of the hydraulic accumulator, this line being situated parallel to a pressure scale, pressure regulator or pressure-maintaining valve. The pressure scale is controlled dependent on the pressure prevailing in the hydraulic cylinder and in the hydraulic accumulator. Pressure compensation devices of this sort are known from the prior art and are offered for example by the firm HYDAC.

The conveying means that produces a control pressure and the conveying means that produces a filling pressure can be a joint conveying means or can form two or more separate conveying means. For example, a conveying means fashioned as a hydraulic pump can be designed and situated in such a way that it supplies on the one hand a filling pressure for the hydraulic accumulator and on the other hand also supplies a control pressure for the control pressure device via suitable pressure control means, for example via an accumulator that always supplies a constant control pressure and that is charged via the conveying means. However, the use of two separate conveying means or hydraulic pumps is also contemplated.

In the following, the present invention and its advantages, as well as advantageous developments and constructions of the present invention, are described and explained in more detail on the basis of the drawings, which indicate a plurality of exemplary embodiments of the present invention.

DESCRIPTION

Figure 1:
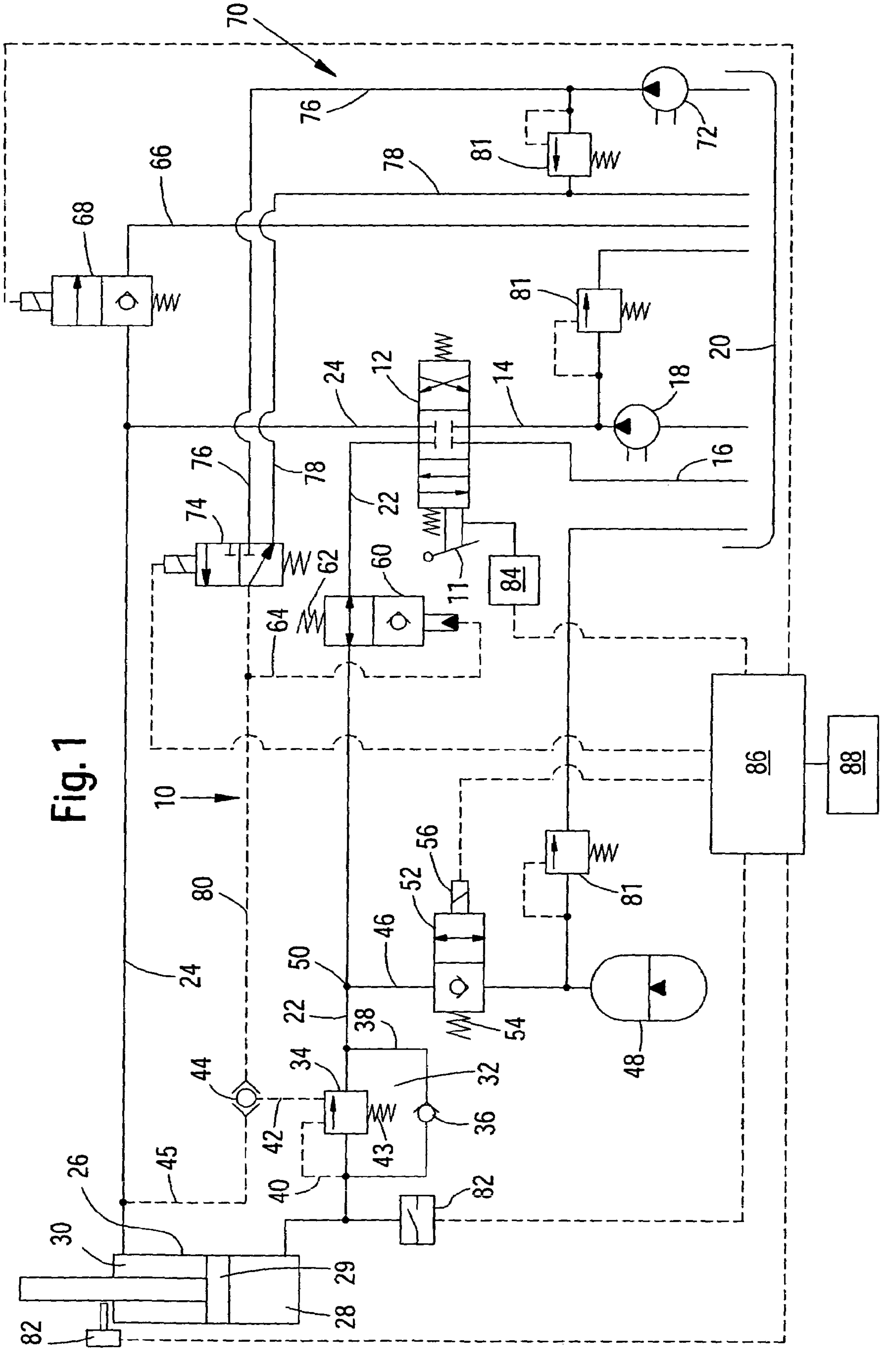
FIG. 1 is a schematic diagram of a first hydraulic system, in accordance with an embodiment of the present invention.

In accordance with an embodiment of the present invention, a hydraulic system 10 for use in a suspension system of a machine is shown in FIG. 1. Hydraulic system 10 contains a control device 12 that can be switched via an actuating device 11. Control device 12 is, for example, a gate valve connected via hydraulic lines 14, 16 to a conveying means 18, for example, a hydraulic pump, and to a hydraulic tank 20. Control device 12, preferably, is switchable between three operating positions: lifting position, neutral position, and lowering position. The switching of control device 12, preferably, is actuated by mechanical means, but can also be actuated electrically, hydraulically, or pneumatically.

Control device 12 is connected to a hydraulic cylinder 26 by first supply line 22 in communication with a first chamber 28 of hydraulic cylinder 26 and second supply line 24 in communication with a second chamber 30 of hydraulic cylinder 26. A piston 29 separates the two chambers 28, 30 from one another. First chamber 28 of hydraulic cylinder 26 represents the piston floor side, or lifting side chamber, whereas second chamber 30 represents the piston rod side, or lowering side chamber of hydraulic cylinder 26.

A load holding device 32, or a hose breakage safety device, is provided in first supply line 22. Load holding device 32 has a pressure and spring controlled pressure relief valve 34 as well as a check valve 36 that opens towards the hydraulic cylinder side and is parallel connection with respect to pressure relief valve 34 via a bypass line 38. A pressure connection is created from pressure relief valve 34 to the hydraulic-cylinder-side segment of first supply line 22 by a control pressure line 40. Another control pressure line 42 creates a pressure connection between pressure relief valve 34, which is held in the closed position by an adjustment spring 43, to a shuttle valve 44. Shuttle valve 44 is connected at its outlet side to control pressure line 42 and at its inlet side to an additional control pressure line 45. Control pressure line 45 connects shuttle valve 44 to second supply line 24.

A hydraulic line 46 connects first supply line 22 to a hydraulic accumulator 48, the end 50 of hydraulic line 46 not connected to hydraulic accumulator 48 is connected between load holding device 32 and switching device 12.

An on-off valve 52 is situated in hydraulic line 46. On-off valve 52 represents an electrically switchable seat or globe valve that is held in the closed position by an adjustment spring 54 and can be brought into an open position by a magnetic coil 56. However, on-off valve 52 can also be fashioned so as to be hydraulically switchable.

In the closed position, on-off valve 52 closes in the direction of hydraulic accumulator 48. On-off valve 52 can also be fashioned so that it seals in both directions without leakage. In the open position, a hydraulic flow is ensured in both directions in order to create a suspension function between hydraulic cylinder 26 and hydraulic accumulator 48.

Between end 50 of hydraulic line 46 and control device 12, an additional on-off valve 60 is provided in first supply line 22. In its normal position, on-off valve 60 is held in an open position by an adjustment spring 62. Via a control pressure line 64, second on-off valve 60 can be brought into a closed position, the on-off valve closing in the direction of control device 12 without leakage. Here it is also possible to fashion on-off valve 60 so as to be electrically switchable.

Second supply line 24 is connected to hydraulic tank 20 via an additional line 66, an on-off valve 68 is situated in line 66. On-off valve 68 is preferably fashioned as a seat valve and can be switched electrically into an open position or can be brought into a position that closes in the direction of hydraulic tank 20. Alternatively, on-off valve 68 may be configured to be hydraulically or pneumatically switchable.

Hydraulic system 10 includes a control pressure device 70. Control pressure device 70 has an additional conveying means 72 that is connected to hydraulic tank 20. In addition, control pressure device 70 has a control pressure valve 74 that is connected via a supply line 76 to conveying means 72 and via an additional supply line 78 to hydraulic tank 20. Control pressure valve 74 can be switched in such a way that a control pressure line 80 can be connected either to conveying means 72 or to hydraulic tank 20. Control pressure line 80 is connected at the inlet side to shuttle valve 44. In addition, control pressure line 80 is connected to control pressure line 64 of on-off valve 60.

In addition, pressure relief valves 81 are provided in hydraulic system 10, via which conveying means 18, 72, as well as hydraulic accumulator 48, are connected to the hydraulic tank in order to prevent a pressure overload.

In the embodiments shown in FIGS. 1, 2, 3, 4, and 6, a sensor 82 is provided that detects the position of hydraulic cylinder 26. For example, sensor 82 can be combined as a contact switch that signals a predetermined position of piston 29. Alternatively, this sensor 82 can also be combined as a pressure sensor or pressure switch (see FIG. 1), the pressure sensor or pressure switch produces a signal at a predetermined pressure of first chamber 28.

Control device 12 is connected to a switch or sensor 84 that detects the position of control device 12 and emits a control signal to an electronic control device 86. In addition, an activation switch 88 is provided that is connected to control unit 86. Control unit 86 is configured to switch electrically switchable on-off valves 52, 68, or control pressure valve 74.

When suspension is not activated (i.e., on-off valves 52, 68 are in the closed position and control pressure valve 74 is switched such that control pressure line 80 is connected to hydraulic tank 20), the operating states “lifting,” “lowering,” and “neutral position” for hydraulic cylinder 26 are controlled as follows via control device 12 in corresponding operating positions. As is shown in FIGS. 1 to 6, control device 12 is held in the neutral position; i.e., it is closed and no flow of hydraulic fluid takes place. As shown in FIGS. 1 to 6, control device 12 is brought from the neutral position into the lifting or lowering position by means of actuating device 11 after the receipt of a control signal or by manual actuation. Actuating device 11 can also be operated electrically, hydraulically, or pneumatically.

In the lifting position, the connection of first supply line 22 to conveying means 18 and the connection of second supply line 24 to hydraulic tank 20 are created. Conveying means 18, connected to hydraulic tank 20, fills first chamber 28 of hydraulic cylinder 26 via first supply line 22 and via on-off valve 60, which is in the open position, as well as via check valve 36 of load holding device 32 (pressure relief valve 34 of load holding device 32 is in the closed position). As a result, piston 29 moves in the direction of second chamber 30, and presses the oil situated there through second supply line 24 into hydraulic tank 20. If switching now takes place back into the neutral position, control device 12 interrupts the connections to conveying means 18 and to hydraulic tank 20, so that the pressure in the two chambers 28, 30 of hydraulic cylinder 26 is maintained, and the movement of piston 29 is stopped and piston 29 remains stationary.

In the lowering position, the connection of first supply line 22 to hydraulic tank 20 and the connection of second supply line 24 to conveying means 18 are created. The conveying means conveys oil into second chamber 30 of hydraulic cylinder 26, and the pressure building up in second supply line 24 opens pressure relief valve 34 of load holding device 32 via control pressure line 45, and also opens shuttle valve 44 and control pressure line 42. At the same time, piston 29 is moved in the direction of first chamber 28, so that the oil flowing out of first chamber 28 moves into hydraulic tank 20 via first supply line 22 and via the open pressure relief valve 34.

Load holding device 32, thus, ensures that in the neutral position hydraulic cylinder 26 maintains its position, in the lifting and neutral position, no oil can escape from pressure-charged first chamber 28, and that in the lowering position the oil can flow off from first chamber 28 via the opened pressure relief valve 34. As depicted, load holding device 32 is located at the lifting side of hydraulic cylinder 26, the lifting side being the side of hydraulic cylinder 26 in which a pressure is built up in order to lift a load. In the exemplary embodiments shown in FIGS. 1 to 6, the lifting side is first chamber 28 of hydraulic cylinder 26, however, by rotating hydraulic cylinder 26, second chamber 30 could also act as the lifting side. Control pressure line 40 represents an overload safety device, so that when there are excessive operating pressures in first chamber 28 of hydraulic cylinder 26, which could result for example from excessive carried loads or from heating of hydraulic cylinder 26, a threshold limit pressure is reached that opens pressure relief valve 34 in order to reduce the pressure. In these states, which deviate from the normal case, pressure relief valve 34 can also be opened in the lifting and neutral positions via control pressure line 40.

It should be noted that on-off valve 60 is open in its normal position, and permits a free flow in both directions. On-off valve 60 is closed by a hydraulic control pressure that moves on-off valve 60 into a switching position in which only a flow in the direction of lifting cylinder 26 is permitted. In the opposite direction, on-off valve 60 is leak proof such that required standards concerning the lowering of a load can be met. Shuttle valve 44 connects control pressure lines 45, 80, which come from control pressure valve 74 and the rod side of lifting cylinder 26, with control pressure line 42 of pressure relief valve 34 in such a way that pressure relief valve 34, which represents a part of load holding device 32, can be opened. Control pressure valve 74 serves to conduct the control pressure of conveying means 72 to pressure relief valve 34 and to on-off valve 60 in order to open or close these. In the normal position, shown in FIGS. 1 to 6, of control pressure valve 74, control pressure lines 42, 64, 80 are relieved of stress towards hydraulic tank 20, so that pressure relief valve 34 and on-off valve 60 are in the normal position (pressure relief valve 34 is closed and on-off valve 60 is open). If control pressure valve 74 is switched, hydraulic fluid flows via control pressure lines 42, 64, 80 to pressure relief valve 34 and to on-off valve 60. In this way pressure relief valve 34 is opened and on-off valve 60 is closed.

In order to ensure optimal protection when a hose breaks, hydraulic cylinder 26, load holding device 32, on-off valve 52, hydraulic accumulator 48, and on-off valve 60, as well as the connecting lines, are preferably parts of an assembly made of steel. This can be a valve block fastened to hydraulic cylinder 26 together with hydraulic accumulator 48, or can be an assembly of valves connected to steel lines. Other parts of the hydraulic system can also be integrated into the named assemblies.

The suspension function having the specific embodiments shown in FIGS. 1 to 6 for a hydraulic system according to the present invention can be realized as described below. Shuttle valve 44, on-off valve 52, on-off valve 68, and control pressure valve 74, shown in FIGS. 1 to 6, are utilized for the suspension function.

With reference to the exemplary embodiment shown in FIG. 1, an activation of the suspension function is enabled by sensor 82, connected to control unit 86, which sensor detects a lowered position (given the use of a contact or position sensor) or a low-pressure operating state (given use of a pressure sensor) of hydraulic cylinder 26. In order to activate the suspension function, activation switch 88 connected to control unit 86 is actuated. Control unit 86 actuates on-off valve 52 and brings this valve into an open position, through which hydraulic accumulator 48 is connected to supply line 22. At the same time, control pressure valve 74 is controlled, which releases a control pressure and, via control pressure lines 42, 80 in connection with shuttle valve 44, opens pressure relief valve 34 and, via pressure control lines 64, 80, brings on-off valve 60 into the leakage-free closed position. In addition, on-off valve 68 connected to control unit 86 is simultaneously opened.

Through the actuation of control pressure valve 74, a connection between the lifting side of hydraulic cylinder 26 and hydraulic accumulator 48 is accomplished and, which is sealed in leak-free fashion towards the hydraulic tank. A sudden pressure increase in first chamber 28 of hydraulic cylinder 26 (bouncing up) is not possible, because in the closed position of on-off valve 52 a flow can take place through this valve in the direction of hydraulic cylinder 26, so that at hydraulic accumulator 48 a pressure compensation in the direction of hydraulic cylinder 26 can always take place. Hydraulic cylinder 26 can be lifted or held via the already-described operating positions, and an exchange of hydraulic fluid can take place via the open connection (on-off valve 52 is open) between hydraulic cylinder 26 and hydraulic accumulator 48, so that a suspension function is provided. The rod side, or second chamber 30, of hydraulic cylinder 26 is connected to hydraulic tank 20 (on-off valve 68 is open), in order to enable a free oscillation of cylinder piston 29, or to prevent a cavitation effect in chambers 28, 30. If the suspension function is deactivated via activation switch 88, on-off valves 52, 68, as well as control pressure valve 54, are switched without flow. Control pressure lines 42, 64, 80 are here switched pressureless, whereby pressure relief valve 34 is again brought into the closed position and on-off valve 60 is again brought into the open position. It is conceivable to control pressure relief valve 34, as well as on-off valve 60, via separate pressure control valves (not shown) in accordance with control pressure valve 74, in order to compensate or to take into account time delays in the response characteristic of pressure relief valve 34 or of on-off valve 60, so that hydraulic cylinder 26 does not change its position due to an overlapping of the switching times. However, this can also be achieved hydraulically using a throttle (not shown) in control pressure line 64.

The lowering operating state of hydraulic cylinder 26 (moving cylinder piston 29) is not possible when the suspension function is activated with the hydraulic system shown in FIG. 1, because on-off valve 60 is closed in the direction of control device 12. In order to ensure a frictionless transition from an operating state (lifting or normal position) with suspension function into the lowering operating state, the position of control device 12 is detected via sensor 84. If control device 12 is brought into the lowering position, a control signal is automatically sent by sensor 84 to control unit 86, and the suspension function is deactivated by switching on-off valve 52 and pressure control valve 74. At the same time, on-off valve 68 is closed. When the suspension function is deactivated, hydraulic accumulator 48 empties via opened on-off valve 60, and must be charged again for a new activation of the suspension function. Preferably, for this purpose hydraulic cylinder 26 is brought into a fully lowered position, so that the pressure in hydraulic cylinder 26 can build up together with the pressure in the hydraulic accumulator. A new activation of the suspension function can then take place after a new release by sensor 82, because hydraulic cylinder 26 has been brought into its fully lowered position.

When the suspension function is activated, cylinder piston 29 can cushion freely in the lifting operating position and in the normal position. If this piston moves downward due to an impact transmitted to it, the oil is pressed from first chamber 28 into hydraulic accumulator 48. The pressure building up in hydraulic accumulator 48 causes the oil to flow back into first chamber 28, so that piston 29 moves upward again. This cushioning movement repeats as necessary until the impact has been completely compensated.

Figure 2:
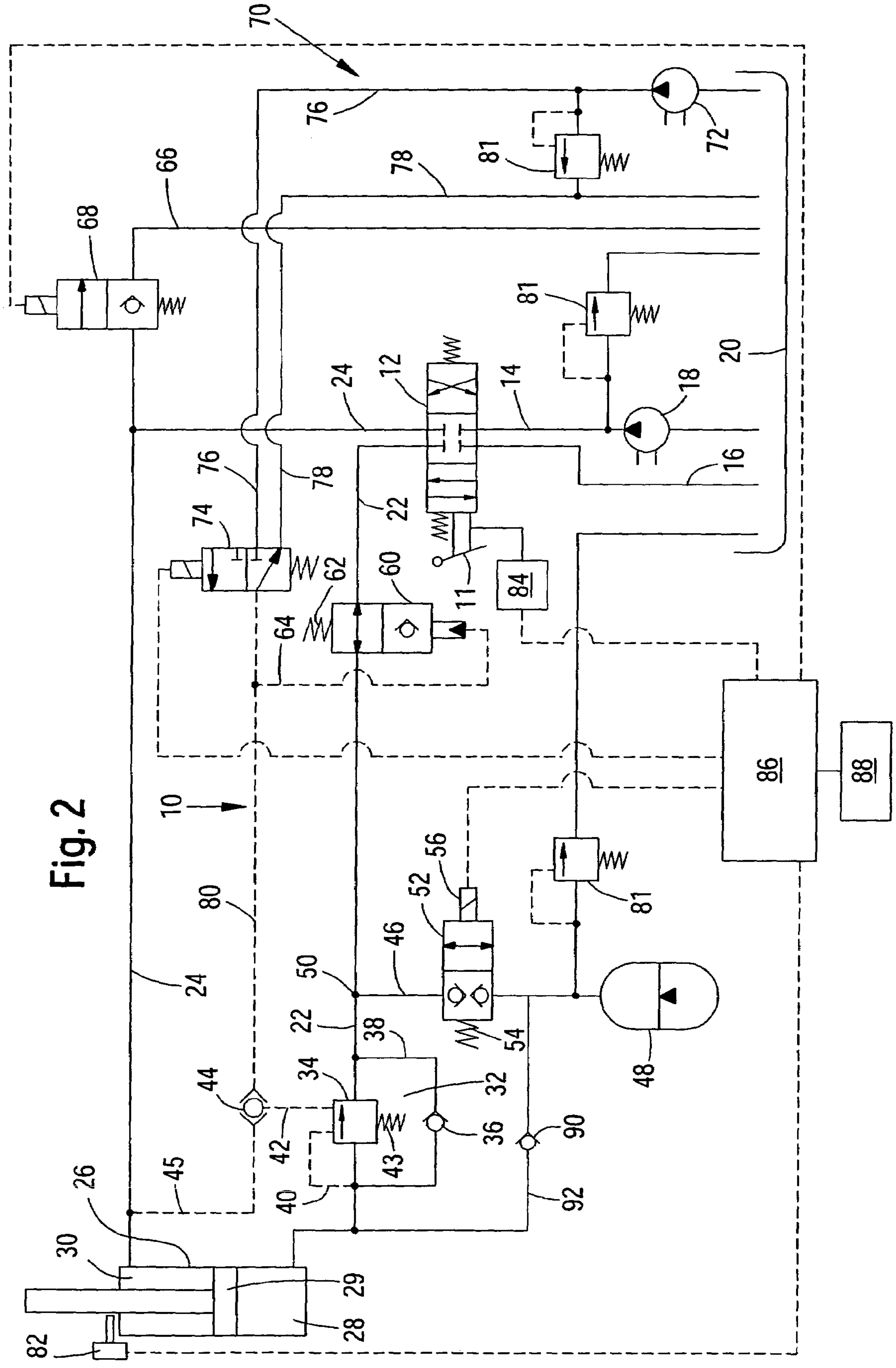
FIG. 2 is a schematic diagram of another hydraulic system, in accordance with an embodiment of the present invention.

FIG. 2 shows an alternative exemplary embodiment in which a deactivation of the suspension function for the lowering of hydraulic cylinder 26 takes place only at times during the lowered state. Subsequently, the suspension function can be resumed without moving again into a release position detected by sensor 82. The difference from the hydraulic system shown in FIG. 1 is that in its closed position, on-off valve 52 of hydraulic accumulator 48 closes in leak-free fashion at both sides, so that in the closed position hydraulic accumulator 48 cannot empty in the direction of hydraulic tank 20. In addition, a pressure compensation is nonetheless ensured between hydraulic accumulator 48 and the hydraulic cylinder (this compensation is provided in the exemplary embodiment shown in FIG. 1 via on-off valve 52 in the closed position in combination with check valve 36), in that an additional line 92 having a check valve 90 is provided that creates a connection from second chamber 28 of hydraulic cylinder 26 to hydraulic accumulator 48, check valve 90 closing in the direction of hydraulic accumulator 48. Via line 92, on the one hand a pressure compensation can take place, and on the other hand hydraulic accumulator 48 can empty via pressure relief valve 34 in a controlled fashion, so that at all times during the lowering the pressure in hydraulic accumulator 48 is equal to the pressure in hydraulic cylinder 26. Thus, sudden pressure discharges between hydraulic accumulator 48 and hydraulic cylinder 26 when switching from one operating state into another operating state are avoided. Also, in the exemplary embodiment shown in FIG. 2, at the beginning of a suspension cycle, i.e., at the beginning of a planned working cycle in which the suspension function is to be used, hydraulic cylinder 26 must be brought into its lowest position so that hydraulic accumulator 48 and hydraulic cylinder 26 are exposed to a common (calibrating) pressure. In the exemplary embodiment shown in FIG. 2, in addition to the exemplary embodiment shown in FIG. 1 it is possible to switch hydraulic cylinder 26 from the lifting operating state or the neutral position into the lowering operating state, and subsequently again to move directly into the suspension state.

in order to enable the lowering operating position during the suspension state, here as well the switching position of control device 12 is acquired via sensor 84. Analogous to the exemplary embodiment shown in FIG. 1, on the basis of the signal from sensor 84 on-off valves 52, 68 and control pressure valve 74 are controlled by control unit 86 so as to deactivate the suspension state for the duration of the lowering operating state. If control device 12 is switched from the lowering operating position into a different operating position, via control unit 86 on-off valves 52, 68 and control pressure valve 74 are again switched and the suspension function is activated. A sudden bouncing up of hydraulic cylinder 26 is prevented by check valve 90 ensuring the same pressure prevails in hydraulic accumulator 48 as in hydraulic cylinder 26. This function is important for the case in which the load has changed during the lowering of the boom (simultaneous emptying and putting down of a pallet). A temporal sequence of switching processes introduced by control unit 86 can be controlled as necessary using throttles, additional valves, or electronic time delay elements.

Figure 3:
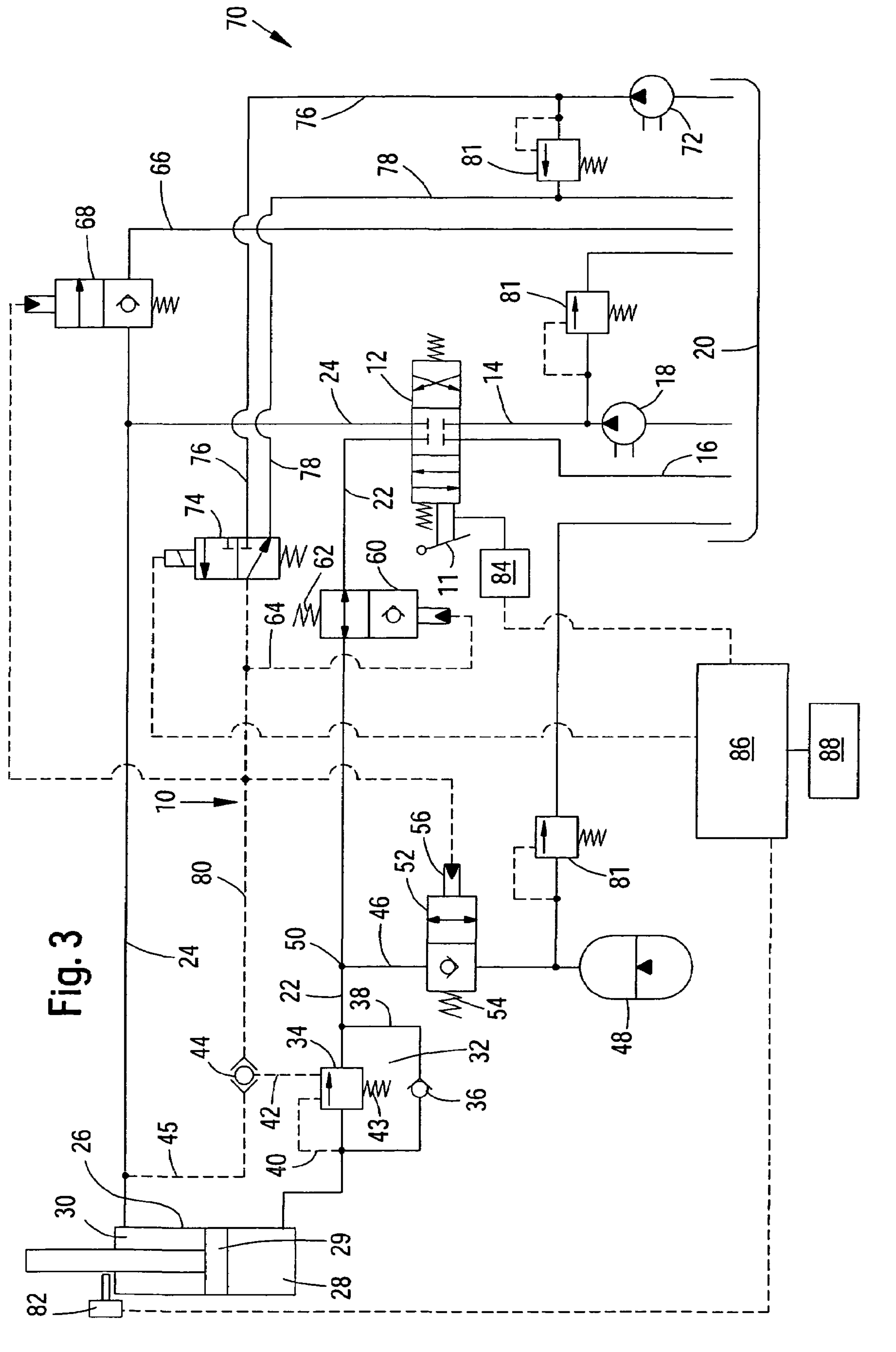
FIG. 3 is a schematic diagram of another hydraulic system, in accordance with an embodiment of the present invention.

FIG. 3 shows another exemplary embodiment in accordance with the present invention. On-off valves 52, 60, 68 are fashioned as pressure-controlled on-off valves 52, 60, 68, and are switched in common via control pressure valve 74. Temporal sequences are controlled for example via throttles (not shown). The exemplary embodiment shown in FIG. 3 additionally corresponds to the exemplary embodiment shown in FIG. 1, and such a pressure-controlled situation and design of on-off valves 52, 60, 68 is also suitable for the exemplary embodiment shown in FIG. 2.

Figure 4:
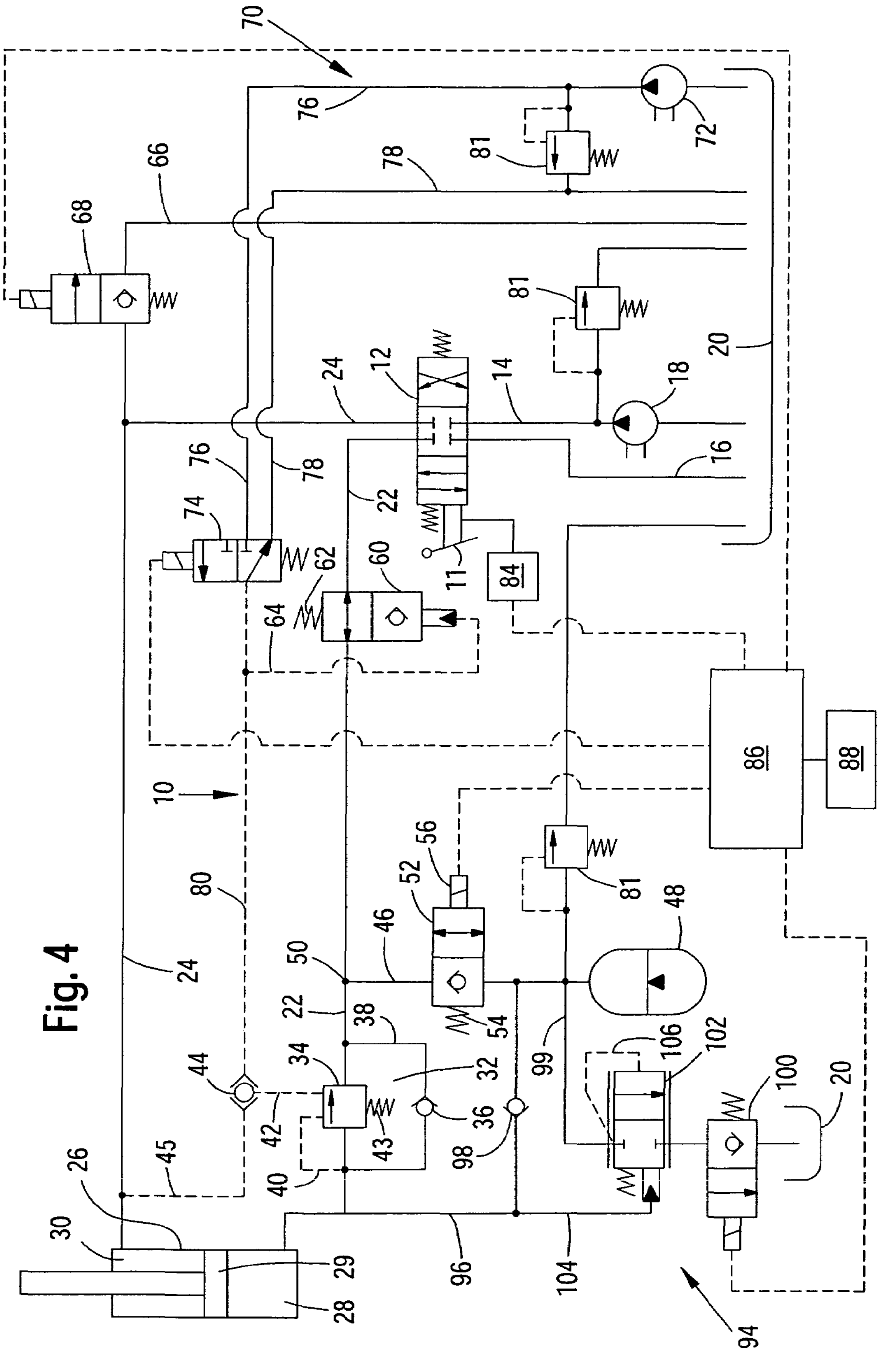
FIG. 4 is a schematic diagram of another hydraulic system, in accordance with an embodiment of the present invention.

FIG. 4 shows an additional exemplary embodiment corresponding essentially to the exemplary embodiment shown in FIG. 1. However, pressure compensation device 94 is additionally provided. Pressure compensation device 94 has a line 96 that extends between hydraulic accumulator 48 and hydraulic cylinder 26, and includes a check valve 98 that closes in the direction of hydraulic cylinder 26. In addition, a line 99 is provided that extends between hydraulic accumulator 48 and an on-off valve 100 connected to hydraulic tank 20, and that is provided with a pressure scale 102. Pressure scale 102 is controlled via pressure lines 104, 106 on the one hand by the pressure acting in line 96, and is controlled on the other hand by the pressure acting in line 99. Depending on the ratio of these two pressures, pressure scale 102 switches into a closed position or into an open position to on-off valve 100. On-off valve 100 has a closed position oriented in the direction towards hydraulic tank 20 and an open position. In comparison with the exemplary embodiments shown in FIGS. 1 to 3, here a sensor 82 for determining the position of hydraulic cylinder 26 can be omitted. Hydraulic accumulator 48 is here always charged with at least the highest load pressure of hydraulic cylinder 26 during a particular operating state. Here it is not required to lower hydraulic cylinder 26 before activating the suspension state; rather, the suspension state can be activated at any time after a pressure compensation has taken place between hydraulic accumulator 48 and hydraulic cylinder 26. Such a pressure compensation can be effected by switching on-off valve 100 so as to open it briefly. This can, for example, take place automatically upon actuation of activation switch 88 for the suspension state by control unit 86. However, a manual actuation is also contemplated by the present invention. In other respects, the functioning of the hydraulic system shown in FIG. 4 resembles that of the previously described hydraulic system from FIG. 1.

Figure 5:
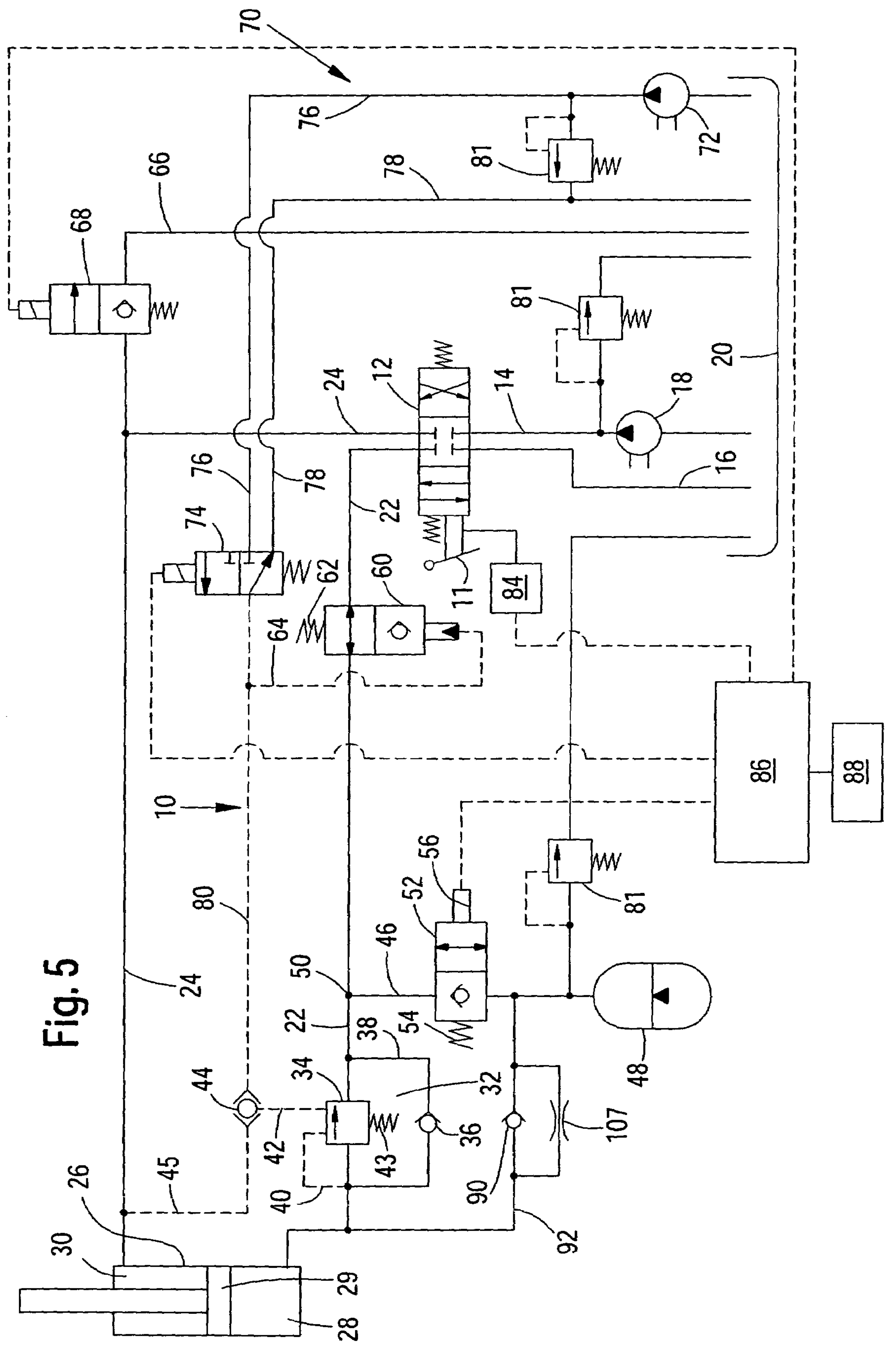
FIG. 5 is a schematic diagram of another hydraulic system, in accordance with an embodiment of the present invention.

With reference to FIG. 5, another exemplary embodiment is illustrated. The hydraulic system shown in FIG. 5 corresponds essentially in its functioning and design to the exemplary embodiment shown in FIG. 2. However, in the present embodiment, on-off valve 52 has a leak-free closing position in the direction of control device 12, and check valve 90 of line 92 is situated parallel to a throttle 107 that is situated in line 92. Here as well, a sensor 82 that detects the position of the hydraulic cylinder is not necessary, because due to the described location of check valve 90 and throttle 107 and the design of on-off valve 52, a pressure compensation between hydraulic accumulator 48 and hydraulic cylinder 26 can take place at all times. As a result, when the suspension function is activated hydraulic cylinder 26 cannot lower and also cannot raise or bounce up. The suspension function can, thus, be activated at any time, independent of the position of hydraulic cylinder 26. As in the previously described exemplary embodiments relating to FIGS. 1 to 4, in the lowering operating position of control device 12 a deactivation of the suspension function is introduced by control unit 86 for the duration of the lowering operating state, in order to avoid an emptying of hydraulic accumulator 48. In this exemplary embodiment, it is conceivable to omit check valve 90, but this will have an adverse effect on the functionality of the pressure compensation. Hydraulic accumulator 48 would then experience a delayed pressure compensation, which would result in some decrease in comfort, but the functionality of the suspension function or of the hydraulic system would not be limited. In the handling of larger loads, a brief lagging or recoil of hydraulic cylinder 26 could occur due to the delayed pressure relief of hydraulic accumulator 48 in the direction of hydraulic cylinder 26.

Figure 6:
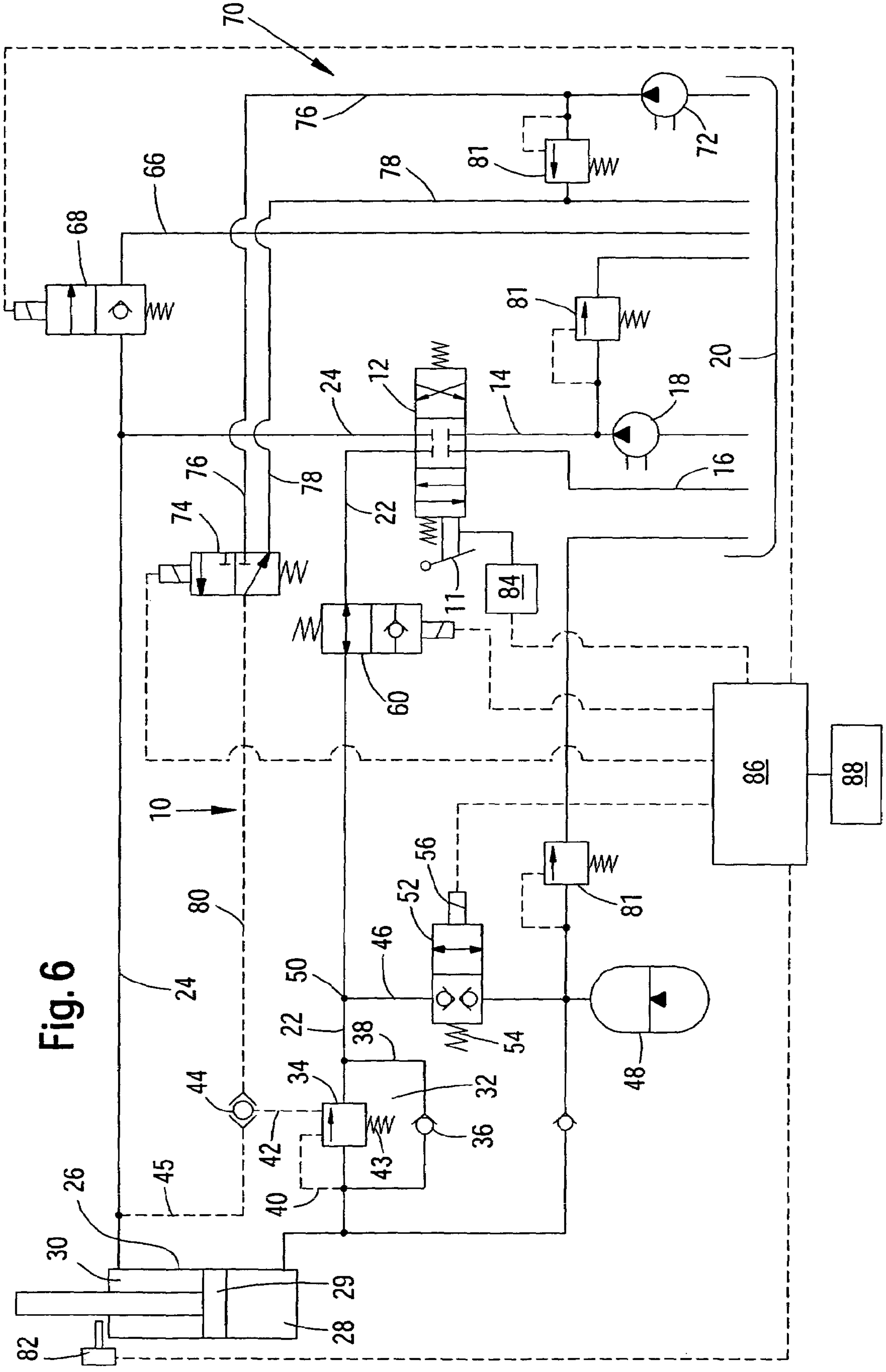
FIG. 6 is a schematic diagram of another hydraulic system, in accordance with an embodiment of the present invention.

FIG. 6 shows another exemplary embodiment that essentially resembles the exemplary embodiment according to FIG. 2. The difference is that on-off valve 52 is controlled electrically. In other respects, the manner of functioning in the present embodiment is the same as the manner of functioning of the exemplary embodiment in FIG. 2. In the present embodiment, control pressure valve 74 is used only to control pressure relief valve 34. On-off valves 52, 60, 68, and control pressure valve 74, but in particular on-off valve 60 and control pressure valve 74, are controlled and monitored by control unit 86. This is important in order to ensure that control pressure valve 74 closes pressure relief valve 34, should on-off valve 60 spring into its open position during the suspension state, for example due to an electrical defect (cable breakage, burned-out coil, etc.). Should this not take place, in the suspension state hydraulic cylinder 26 would be capable of lowering in an uncontrolled manner. Such an electrical controlling of on-off valve 60 is also contemplated for the other depicted exemplary embodiments.

Figure 7:
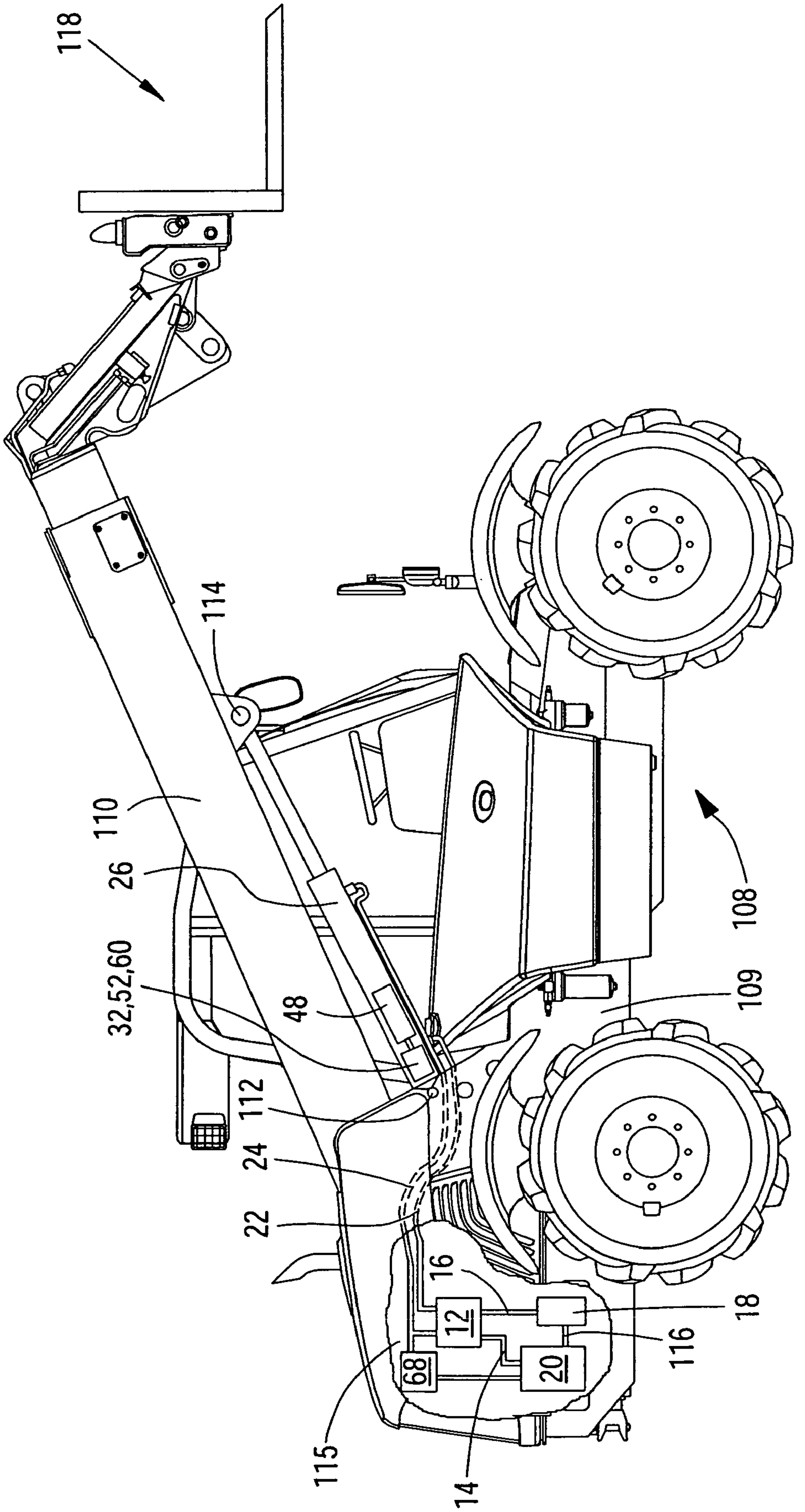
FIG. 7 is a schematic representation of a loading device, fashioned as a telescope loader, having a hydraulic system in accordance with an embodiment of the present invention.

An application for the exemplary embodiments shown in FIGS. 1 to 6 is shown in FIG. 7. FIG. 7 shows a mobile telescope loader 108 having a boom 110 that can be extended telescopically and that is coupled in pivotable fashion to a frame 109 of telescope loader 108. A hydraulic cylinder 26 for raising and lowering boom 110 is situated between boom 110 and frame 109. Further, hydraulic cylinder 26 is coupled in pivotable fashion to a first and to a second bearing point 112, 114, the piston rod side being coupled to second bearing point 114 on boom 110 and the piston floor side being coupled to first bearing point 112 on frame 109. In addition, hydraulic tank 20, conveying means 18, and control device 12 are positioned at or in a housing 115, and are connected to one another via hydraulic lines 14, 16, 116. In addition, in FIG. 7 supply lines 22, 24 are disposed between control device 12 and hydraulic cylinder 26. Load holding device 32, as well as on-off valve 52 and on-off valve 60, are situated in a common valve module directly on hydraulic cylinder 26. On-off valve 68 is positioned in housing 115 together with control device 12. Hydraulic accumulator 48 is, preferably, likewise situated directly on hydraulic cylinder 26, so that hydraulic line 46 can be fashioned as a rigid connection between the common valve module and hydraulic accumulator 48, requiring no separate breakage safeguarding device. Control unit 86 generates control or switching signals which switch or control on-off valves 52, 60, 68, as well as control pressure valve 74, depending on the status of sensors 82, 84 or activation switch 88.

In FIG. 7, control unit 86, sensors 82, 84, activation switch 88, control pressure device 70 are not shown. The location of such components is well known in the prior art and can be executed by someone skilled in the art in a known manner.

Corresponding to the above-described switching positions, hydraulic cylinder 26 can be actuated in such a way that boom 110 can be lifted, held steady, or lowered, and a suspension state can be set or activated for the individual operating states, as described above and illustrated in FIGS. 1 to 6. When the suspension function is activated, it is ensured that during an excitation, for example due to the traveling mechanism of telescope loader 108, impact-type accelerations due to a free oscillation of boom 110 are damped, so that traveling comfort is increased, in particular if a work tool 108 is used to pick up and move loads.

Although the present invention has been described on the basis of some exemplary embodiments, in the light of the foregoing description and the drawings someone skilled in the art will infer a large number of different alternatives, modifications, and variants falling within the scope of the present invention. Thus, for example, the hydraulic system can also be applied to other vehicles, for example to wheel loaders or front-end loaders or to baggers or cranes having components that can be actuated hydraulically and that can be lifted or lowered and in which a suspension is considered desirable.

The foregoing disclosure is the best mode devised by the inventor for practicing this invention. It is apparent, however, that methods incorporating modifications and variations will be obvious to one skilled in the art of motor vehicle clutches and lubrication thereof. Inasmuch as the foregoing disclosure is intended to enable one skilled in the pertinent art to practice the instant invention, it should not be construed to be limited, thereby but should be construed to include such aforementioned obvious variations and be limited only by the spirit and scope of the following claims.

I claim:

1. A hydraulic system for a suspension system, the hydraulic system comprising:

a hydraulic cylinder;

a conveying means that produces a filling pressure;

a hydraulic tank;

a control device connected to the conveying means and to the hydraulic tank;

a first control pressure line that connects the control device to a first chamber of the hydraulic cylinder;

a load holding device disposed in the first line, wherein the load holding device is switchable between a closed position in the direction of the control device to an open position;

a first on-off valve is disposed in the first line between the load holding device and the control device, wherein the first on-off valve is switchable between an open position and a closed position in the direction of the control device; and a hydraulic accumulator connected to the first line wherein the hydraulic accumulator is connected to the first line between the load holding device and the first on-off valve, and the load holding device and the first on-off valve are controlled essentially synchronously independent of a filling pressure of the hydraulic cylinder.

2. The hydraulic system according to claim 1, further comprising a hydraulic control pressure device having a conveying means that produces a control pressure, at least one first control pressure line and at least one first control pressure valve that connects the first control pressure line to one of the conveying means and the hydraulic tank.

3. The hydraulic system according to claim 2, further comprising a shuttle valve for controlling the load holding device using one of a control pressure at the first control pressure line and a control pressure at a second control pressure line that is connected to a second chamber of the hydraulic cylinder.

4. The hydraulic system according to claim 3, further comprising a pressure-controlled means connected to the load holding device by a fourth control pressure line.

5. The hydraulic system according to claim 4, further comprising a fifth control pressure line connected to the load holding device and to the first chamber of the hydraulic cylinder.

6. The hydraulic system according to claim 2, further comprising a third control pressure line wherein the third control pressure line connects the first on-off valve to the first control pressure line.

7. The hydraulic system according to claim 1, further comprising a second control pressure line, wherein the second control pressure line connects the control device to a second chamber of the hydraulic cylinder.

8. The hydraulic system according to claim 7, further comprising a third control pressure line connected to the second chamber of the hydraulic cylinder and to the hydraulic tank, wherein the third control pressure line has a third on-off valve switchable between an open position and a closing position.

9. The hydraulic system according to claim 8, further comprising by a fourth control pressure line that is connected to the first chamber and to the hydraulic accumulator, and wherein a check valve is disposed in the fourth control line that closes in the direction of the hydraulic accumulator.

10. The hydraulic system according to claim 8, further comprising a fourth pressure control line that is connected to the first chamber and to the hydraulic accumulator, wherein a check valve is disposed in the fourth control line that closes in the direction of the hydraulic accumulator and wherein a throttle is disposed in parallel connection to the check valve.

11. The hydraulic system according to claim 1, further comprising a second on-off valve disposed between the hydraulic accumulator and the first control pressure line, wherein the second on-off valve is switchable between an open position and a closed position in one direction or both direction.

12. The hydraulic system according to claim 11, wherein at least one of the first and second on-off valves is controlled by the control pressure device.

13. The hydraulic system according to claim 11, wherein at least one of the first and second on-off valves is switched electrically.

14. The hydraulic system according to claim 1, further comprising a sensor for determining a position of the hydraulic cylinder.

15. The hydraulic system according to claim 14, wherein the sensor is a pressure switch for detecting a predetermined pressure of the hydraulic cylinder.

16. The hydraulic system according to claim 1, further comprising a pressure compensation device disposed between the hydraulic accumulator and the first chamber for balancing the pressure in the hydraulic accumulator the first chamber.

17. The hydraulic system according to claim 1, further comprising a conveying means that produces a control pressure that is independent of the conveying means that produces a filling pressure.

18. A loading device having a telescope loader, the device comprising:

a boom;

a hydraulic system for lifting, holding, and lowering the boom, wherein the hydraulic system includes:

a hydraulic cylinder;

a conveying means that produces a filling pressure;

a hydraulic tank;

a control device connected to the conveying means and to the hydraulic tank;

a first control pressure line that connects the control device to a first chamber of the hydraulic cylinder;

a load holding device disposed in the first line, wherein the load holding device is switchable between a closed position in the direction of the control device to an open position;

a first on-off valve is disposed in the first line between the load holding device and the control device, wherein the first on-off valve is switchable between an open position and a closed position in the direction of the control device; and a hydraulic accumulator connected to the first line wherein the hydraulic accumulator is connected to the first line between the load holding device and the first on-off valve, and the load holding device and the first on-off valve are controlled essentially synchronously independent of a filling pressure of the hydraulic cylinder.

* * * * *